United States Patent
Willi

(10) Patent No.: US 9,617,908 B2
(45) Date of Patent: Apr. 11, 2017

(54) FUEL COMBUSTION SYSTEM, NOZZLE FOR PRECHAMBER ASSEMBLY HAVING COOLANT PASSAGE, AND METHOD OF MAKING SAME

(71) Applicant: Caterpillar Inc., Peoria, IL (US)

(72) Inventor: Martin Willi, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 148 days.

(21) Appl. No.: 14/709,029

(22) Filed: May 11, 2015

(65) Prior Publication Data
US 2016/0333771 A1 Nov. 17, 2016

(51) Int. Cl.
F02B 19/18 (2006.01)
F02B 19/10 (2006.01)

(52) U.S. Cl.
CPC ................. F02B 19/1004 (2013.01)

(58) Field of Classification Search
CPC .. F02B 19/1004; F02B 19/18; F02B 23/0654; F02M 57/06; F02M 31/20
USPC ............... 123/260, 261, 285, 286, 297, 541
See application file for complete search history.

(56) References Cited

U.S. PATENT DOCUMENTS

| | | | |
|---|---|---|---|
| 4,452,189 A * | 6/1984 | Latsch | F02B 19/12 123/143 B |
| 5,554,908 A * | 9/1996 | Kuhnert | H01T 13/54 123/260 |
| 5,580,476 A | 12/1996 | Dam et al. | |
| 5,593,607 A | 1/1997 | Dam et al. | |
| 5,601,061 A | 2/1997 | Dam et al. | |
| 5,771,857 A | 6/1998 | Willi | |
| 5,809,957 A | 9/1998 | Antone et al. | |
| 5,868,121 A | 2/1999 | Brown et al. | |
| 5,870,978 A | 2/1999 | Willi et al. | |
| 5,947,076 A | 9/1999 | Srinivasan et al. | |
| 5,975,050 A | 11/1999 | Brown et al. | |
| 6,000,384 A | 12/1999 | Brown et al. | |
| 6,009,860 A | 1/2000 | Brown et al. | |
| 6,019,081 A * | 2/2000 | Divecha | F02B 19/12 123/254 |
| 6,032,617 A | 3/2000 | Willi et al. | |
| 6,044,806 A | 4/2000 | Brown et al. | |
| 6,055,963 A | 5/2000 | Brown et al. | |

(Continued)

FOREIGN PATENT DOCUMENTS

EP 1091104 A1 4/2001

*Primary Examiner* — Hai Huynh
(74) *Attorney, Agent, or Firm* — Leydig, Volt & Mayer, Ltd.

(57) ABSTRACT

A nozzle for a prechamber assembly of an engine includes a nozzle body which is hollow and includes an outer surface, an inner surface, and an orifice surface. The outer surface defines an outer orifice opening, and the inner surface defines an interior chamber and an inner orifice opening. The orifice surface defines an orifice passage extending between, and in communication with, the outer orifice opening and the inner orifice opening. The orifice passage is in communication with the interior chamber via the inner orifice opening. The nozzle body includes a coolant surface which defines a coolant passage within the nozzle body. The coolant surface includes an orifice interface portion disposed adjacent the orifice surface such that the orifice surface and the orifice interface portion of the coolant surface are in heat-transferring relationship with each other.

20 Claims, 6 Drawing Sheets

(56) References Cited

U.S. PATENT DOCUMENTS

| | | | |
|---|---|---|---|
| 6,095,102 A | 8/2000 | Willi et al. | |
| 6,101,986 A | 8/2000 | Brown et al. | |
| 6,158,418 A | 12/2000 | Brown et al. | |
| 6,289,871 B1 | 9/2001 | Brown et al. | |
| 6,386,149 B1 | 5/2002 | Coleman et al. | |
| 6,666,185 B1 | 12/2003 | Willi et al. | |
| 6,739,289 B2 | 5/2004 | Hiltner et al. | |
| 7,007,669 B1 | 3/2006 | Willi et al. | |
| 7,261,097 B2 | 8/2007 | Gong et al. | |
| 7,343,905 B2 | 3/2008 | Willi et al. | |
| 7,467,621 B2 | 12/2008 | Lauper, Jr. et al. | |
| 7,654,086 B2 | 2/2010 | Gong et al. | |
| 7,849,692 B2 | 12/2010 | Baldwin et al. | |
| 7,905,206 B2 | 3/2011 | Willi et al. | |
| 8,028,679 B2 | 10/2011 | Willi et al. | |
| 8,113,173 B2 | 2/2012 | Willi et al. | |
| 8,150,603 B2 | 4/2012 | Willi et al. | |
| 8,181,617 B2 * | 5/2012 | Kuhnert | F02P 23/04 123/143 B |
| 8,365,689 B2 * | 2/2013 | Gruber | F01P 3/16 123/169 PA |
| 8,662,053 B2 * | 3/2014 | LaPointe | F02B 19/12 123/266 |
| 8,757,127 B2 * | 6/2014 | Ishida | F01P 3/16 123/254 |
| 8,783,229 B2 | 7/2014 | Kim et al. | |
| 8,813,716 B2 | 8/2014 | Herold et al. | |
| 8,839,762 B1 * | 9/2014 | Chiera | F02B 19/108 123/256 |
| 8,899,040 B2 | 12/2014 | Vijayaraghavan et al. | |
| 9,217,360 B2 | 12/2015 | Pierz | |
| 9,316,143 B2 * | 4/2016 | Taliaferro | F02B 19/00 |
| 2003/0200939 A1 | 10/2003 | Hiltner et al. | |
| 2003/0221661 A1 | 12/2003 | Willi et al. | |
| 2005/0092285 A1 * | 5/2005 | Klonis | F02B 19/12 123/266 |
| 2007/0000248 A1 | 1/2007 | Gong et al. | |
| 2007/0000472 A1 | 1/2007 | Gong et al. | |
| 2007/0234715 A1 | 10/2007 | Willi et al. | |
| 2008/0022684 A1 | 1/2008 | Baldwin et al. | |
| 2008/0098995 A1 | 5/2008 | Lauper et al. | |
| 2008/0295501 A1 | 12/2008 | Gong et al. | |
| 2009/0320814 A1 | 12/2009 | Fiveland et al. | |
| 2010/0019506 A1 | 1/2010 | Gong et al. | |
| 2010/0126463 A1 | 5/2010 | Willi et al. | |
| 2010/0126465 A1 | 5/2010 | Willi et al. | |
| 2010/0126481 A1 | 5/2010 | Willi et al. | |
| 2010/0131172 A1 | 5/2010 | Willi et al. | |
| 2010/0131173 A1 | 5/2010 | Willi et al. | |
| 2011/0297121 A1 * | 12/2011 | Kraus | F02B 19/1023 123/260 |
| 2011/0297128 A1 | 12/2011 | Kim et al. | |
| 2012/0103302 A1 * | 5/2012 | Attard | F02B 19/12 123/260 |
| 2012/0125287 A1 * | 5/2012 | Chiera | F02B 19/12 123/254 |
| 2012/0210988 A1 | 8/2012 | Willi | |
| 2012/0227397 A1 | 9/2012 | Willi et al. | |
| 2013/0081391 A1 | 4/2013 | Vijayaraghavan et al. | |
| 2013/0139784 A1 | 6/2013 | Pierz | |
| 2013/0160734 A1 * | 6/2013 | Redtenbacher | F02B 19/1004 123/253 |
| 2014/0026847 A1 | 1/2014 | Willi et al. | |
| 2014/0032080 A1 | 1/2014 | Gehrke et al. | |
| 2014/0032081 A1 | 1/2014 | Willi et al. | |
| 2014/0060946 A1 | 3/2014 | Willi | |
| 2014/0158088 A1 | 6/2014 | Gehrke et al. | |
| 2014/0196686 A1 | 7/2014 | Coldren et al. | |
| 2016/0230646 A1 * | 8/2016 | Kim | F02B 19/12 |

* cited by examiner

FUEL COMBUSTION SYSTEM, NOZZLE FOR PRECHAMBER ASSEMBLY HAVING COOLANT PASSAGE, AND METHOD OF MAKING SAME

TECHNICAL FIELD

This patent disclosure relates generally to a fuel combustion system for an internal combustion engine and, more particularly, to a nozzle for a prechamber assembly for an internal combustion engine.

BACKGROUND

One type of internal combustion engines typically employs cylinders which compress a fuel and air mixture such that, upon firing of a spark plug associated with each cylinder, the compressed mixture ignites. The expanding combustion gases resulting therefrom move a piston within the cylinder. Upon reaching an end of its travel in one direction within the cylinder, the piston reverses direction to compress another volume of the fuel and air mixture. The resulting mechanical kinetic energy can be converted for use in a variety of applications, such as, propelling a vehicle or generating electricity, for example.

Another type of internal combustion engine, known as a compression ignition engine, uses a highly-compressed gas (e.g., air) to ignite a spray of fuel released into a cylinder during a compression stroke. In such an engine, the air is compressed to such a level as to achieve auto-ignition of the fuel upon contact between the air and fuel. The chemical properties of diesel fuel are particularly well suited to such auto-ignition.

The concept of auto-ignition is not limited to diesel engines, however, and has been employed in other types of internal combustion engines as well. For example, a self-igniting reciprocating internal combustion engine can be configured to compress fuel in a main combustion chamber via a reciprocating piston. In order to facilitate starting, each main combustion chamber is associated with a prechamber, particularly useful in starting cold temperature engines. Fuel is injected into not only the main combustion chamber, but also the combustion chamber of the prechamber, as well, such that, upon compression by the piston, a fuel and air mixture is compressed in both chambers. A glow plug or other type of heater is disposed within the prechamber to elevate the temperature therein sufficiently to ignite the compressed mixture. The combustion gases resulting from the ignition in the prechamber are then communicated to the main combustion chamber.

Other types of internal combustion engines use natural gas as the fuel source and include at least one piston reciprocating within a respective cylinder. A spark plug is positioned within a cylinder head associated with each cylinder and is fired on a timing circuit such that upon the piston reaching the end of its compression stroke, the spark plug is fired to thereby ignite the compressed mixture.

In still further types of internal combustion engines, prechambers are employed in conjunction with natural gas engines. Given the extremely high temperatures required for auto-ignition with natural gas and air mixtures, glow plugs or other heat sources such as those employed in typical diesel engines can be ineffective. Rather, a prechamber is associated with each cylinder of the natural gas engine and is provided with a spark plug to initiate combustion within the prechamber which can then be communicated to the main combustion chamber. Such a spark-ignited, natural gas engine prechamber is provided in, for example, the 3600 series natural gas engines commercially available from Caterpillar Inc. of Peoria, Ill.

The trend continues to operate these engines under lean-burn conditions. Lean burn refers to the burning of fuel with an excess of air in an internal combustion engine (i.e. lean fuel/air ratio). The excess of air in a lean burn engine combusts more of the fuel and emits fewer unwanted emissions. However, the lean fuel/air ratio can make it difficult to consistently achieve complete and thorough combustion within the main combustion chamber.

The components of internal combustion engines can be subjected to very high temperatures. For example, the surfaces defining the orifices of the nozzle of a member of a fuel combustion system, such as a prechamber nozzle, for example, can be subjected to very high temperatures as a result of the flow and temperature characteristics of the fuel mixtures traveling therethrough. In the case of a prechamber assembly, the high temperatures can be caused by the velocity of the fuel/air mixture entering the nozzle through the orifices and the ignition flame front discharged from the nozzle out through the orifices. As a result, the high temperatures to which the orifices are subjected can cause degradation of the nozzle and impair the function of the nozzle over time.

U.S. Pat. No. 8,813,716 is entitled, "Pre-combustion Chamber Tip," and is directed to a pre-combustion chamber tip for an internal combustion engine. The pre-combustion chamber tip has a first body portion and a second body portion. The first body portion has a pre-combustion chamber located within. The first body portion has a terminal end with a plurality of orifices configured to direct expanding gases out of the pre-combustion chamber. The second body portion is attached to the first body portion. The second body portion has an exterior surface, a cooling fluid opening formed in the exterior surface, a cooling fluid passage in fluid communication with the cooling fluid opening, and a ridge associated with the cooling fluid opening. The ridge extends from the exterior surface and is configured to divert cooling fluid flow into the cooling fluid opening and cooling fluid passage.

There is a continued need in the art to provide additional solutions to enhance the performance of components of a fuel combustion system such as those in a prechamber assembly. For example, high temperatures in the orifice area of a gas engine prechamber nozzle can limit its service life and negatively affect the prechamber assembly's allowable design parameters. As such, there is a continued need to enable a prechamber assembly of a fuel combustion system to operate so as to enhance the combustion of fuel within the system while managing the heat generated during use of the prechamber assembly to improve its durability and usefulness.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a nozzle for a prechamber assembly of an engine. The nozzle includes a nozzle body which is hollow and has an outer surface, an inner surface, and an orifice surface. The outer surface defines an outer orifice opening, and the inner surface defines an interior chamber and an inner orifice opening.

The orifice surface defines an orifice passage extending between, and in communication with, the outer orifice opening and the inner orifice opening. The orifice passage is in communication with the interior chamber via the inner orifice opening.

The nozzle body includes a coolant surface which defines a coolant passage within the nozzle body. The coolant surface includes an orifice interface portion disposed adjacent the orifice surface such that the orifice surface and the orifice interface portion of the coolant surface are in heat-transferring relationship with each other.

In yet another embodiment, a fuel combustion system includes a cylinder housing and a prechamber assembly. The cylinder housing defines a main combustion chamber. The prechamber assembly is in communication with the main combustion chamber. The prechamber assembly defines a precombustion chamber which is in communication with the main combustion chamber.

The prechamber assembly includes a prechamber housing, an ignition device adapted to selectively ignite a fuel supply disposed in the precombustion chamber, and a nozzle. The ignition device is mounted to the prechamber housing. The nozzle is adjacent the prechamber housing. The nozzle at least partially defines the precombustion chamber.

The nozzle includes a nozzle body which is hollow and includes an outer surface, an inner surface, and an orifice surface. The outer surface defines an outer orifice opening. The inner surface defines an interior chamber and an inner orifice opening. The orifice surface defines an orifice passage extending between, and in communication with, the outer orifice opening and the inner orifice opening. The orifice passage is in communication with the interior chamber via the inner orifice opening and with the main combustion chamber via the outer orifice opening.

The nozzle body includes a coolant surface which defines a coolant passage within the nozzle body. The coolant surface includes an orifice interface portion disposed adjacent the orifice surface such that the orifice surface and the orifice interface portion of the coolant surface are in heat-transferring relationship with each other.

In still another embodiment, a method of making a nozzle for a prechamber assembly of an engine is described. The method of making includes manufacturing a nozzle body. The nozzle body is hollow and includes an outer surface and an inner surface. The inner surface defines an interior chamber.

An orifice surface is defined in the nozzle body. The orifice surface defines an orifice passage extending between, and in communication with, an outer orifice opening defined in the outer surface and an inner orifice opening defined in the inner surface. The orifice passage is in communication with the interior chamber via the inner orifice opening.

A coolant surface is defined in the nozzle body. The coolant surface defines a coolant passage within the nozzle body. The coolant surface includes an orifice interface portion disposed adjacent the orifice surface such that the orifice surface and the orifice interface portion of the coolant surface are in heat-transferring relationship with each other.

Further and alternative aspects and features of the disclosed principles will be appreciated from the following detailed description and the accompanying drawings. As will be appreciated, the principles related to fuel combustion systems, prechamber assemblies, and methods of making nozzles for prechamber assemblies disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

The present disclosure provides embodiments of a component of a fuel combustion system of an engine and methods of making the same. In embodiments, the fuel combustion component is in the form of a nozzle of a prechamber assembly which can be mounted to at least one of a cylinder head or cylinder block of an internal combustion engine. Exemplary engines include those used in vehicles, electrical generators, and pumps, for instance.

Embodiments of a nozzle for a prechamber assembly constructed according to principles of the present disclosure can have a nozzle body that includes at least one coolant passage configured to help promote the heat transfer between the nozzle body and a cooling medium disposed within the coolant passage. In embodiments, the nozzle body includes at least one coolant passage configured to facilitate the heat transfer away from an orifice defined within the nozzle body. In operation, the flow of an air/fuel mixture into the prechamber nozzle and/or a flame front discharging from the prechamber nozzle respectively passing through the orifices of the nozzle during intended operation of the fuel combustion system cause elevated temperatures in the orifice bridge of the nozzle body. The nozzle can include at least one coolant passage configured to help draw heat away from the orifice bridge to a cooler region of the nozzle body. Embodiments of a prechamber nozzle constructed according to principles of the present disclosure can be made using additive manufacturing techniques.

Figure 1:
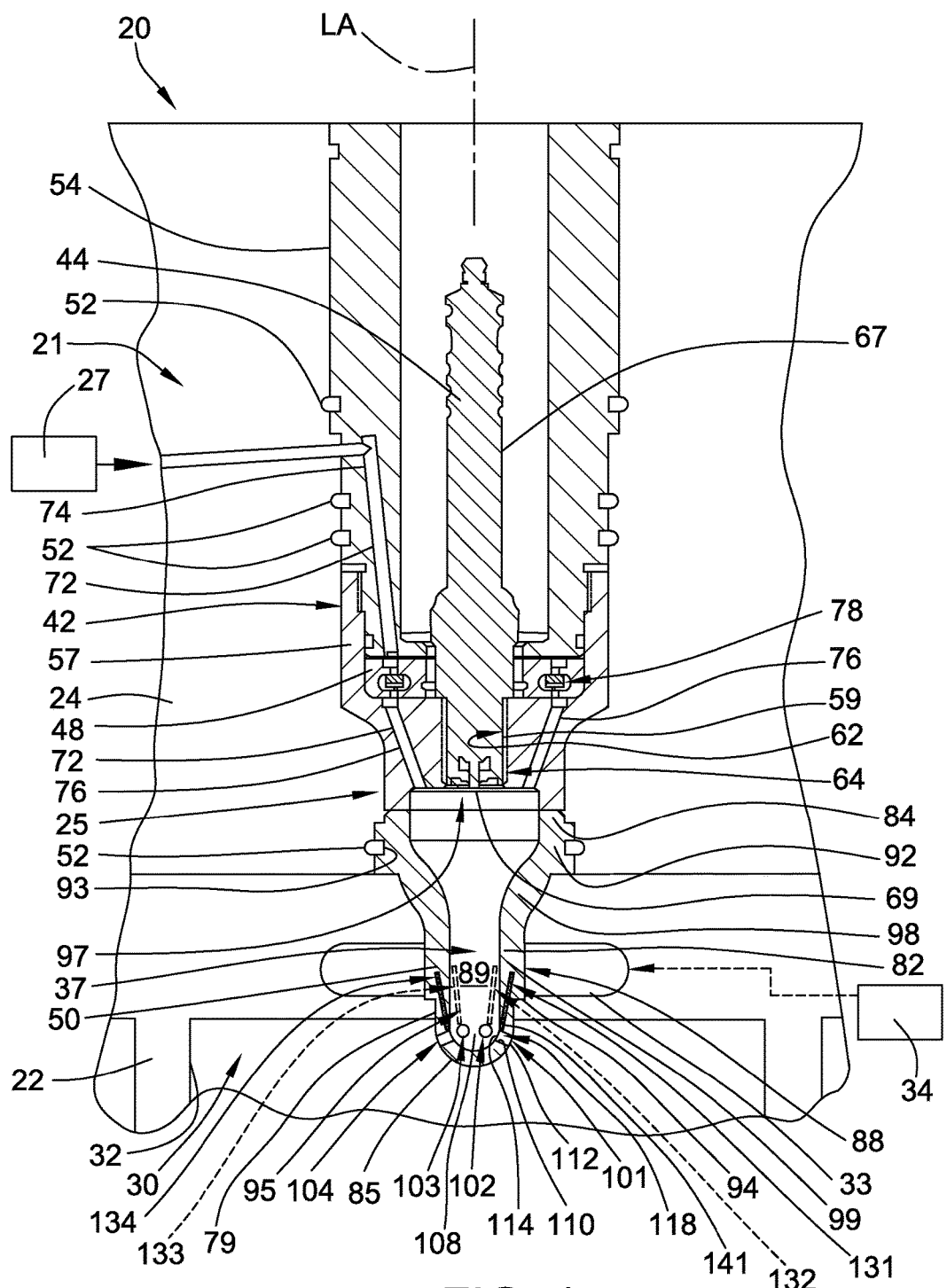
FIG. 1 is a diagrammatic, longitudinal cross-sectional view of an embodiment of a fuel combustion system constructed in accordance with principles of the present disclosure and including an embodiment of a prechamber assembly constructed in accordance with principles of the present disclosure.

Turning now to the FIGURES, there is shown in FIG. 1 an exemplary embodiment of a fuel combustion system 20 constructed in accordance with principles of the present disclosure. The fuel combustion system 20 can be used in any suitable internal combustion engine, such as an engine configured as part of an electrical generator or a pump, for example. The fuel combustion system 20 can be used with any suitable fuel with an appropriate fuel/air ratio. In embodiments, fuels with different ignition and burning characteristics and different specific fuel to air ratios can be used. The fuel combustion system 20 can include a cylinder housing 21 that includes a cylinder block 22 and a cylinder head 24; a prechamber assembly 25 having a fuel combustion component in the form of a nozzle 50 constructed in accordance with principles of the present disclosure; a supplemental fuel source 27; and a variety of other combustion devices, as will be appreciated by one skilled in the art.

Referring to FIG. 1, the cylinder block 22 and the cylinder head 24 can be made from any suitable material, such as a suitable, heat-resistant metal, for example. The cylinder housing 21 defines a main combustion chamber 30. In embodiments, the cylinder block 22 of the cylinder housing 21 at least partially defines the main combustion chamber 30. In embodiments, the cylinder block 22 can define a plurality of cylinders 32 (one of which is shown in FIG. 1) within which is defined the corresponding main combustion chamber 30. In embodiments, a cylinder liner can be disposed within each cylinder 32. The cylinder liner can be removably secured in the cylinder block 22.

The cylinder head 24 can be removably attached to the cylinder block 22 via suitable fasteners, such as a plurality of bolts, as will be appreciated by one skilled in the art. A gasket (not shown) can be interposed between the cylinder block 22 and the cylinder head 24 to seal the interface therebetween. The cylinder head 24 typically has bores machined for engine valves (not shown), e.g., inlet and exhaust valves, and other components of the fuel combustion system 20 (not shown), e.g., fuel injectors, glow plugs, sparks plugs, and combinations thereof, as will be appreciated by one skilled in the art.

Each cylinder 32 of the cylinder block 22 can house a reciprocally movable piston (not shown), which is coupled to a crankshaft via a suitable transfer element (e.g., a piston rod or connecting rod). The piston is reciprocally movable within the cylinder 32 for compressing and thereby pressurizing the combustible mixture in the main combustion chamber 30 during a compression phase of the engine. In embodiments, the engine can be configured to have a suitable compression ratio suited for the intended purpose of the engine, as will be understood by one skilled in the art.

In embodiments, at least one intake valve mechanism (not shown) and at least one exhaust valve mechanism (not shown) can be operatively positioned within the cylinder head 24 such that the intake valve and the exhaust valve are axially movable in the cylinder head 24. In embodiments, a mechanical valve train (e.g., including a cam, follower, and push rod mechanism) or other hydraulic and/or electric control device can be used in a conventional manner to selectively operate the intake valve mechanism and the exhaust valve mechanism. In particular, the inlet valve mechanism can be opened to admit a predetermined amount of a lean gaseous combustible mixture of fuel and air directly into the main combustion chamber 30 above the piston during an intake phase of the engine. The exhaust valve mechanism can be opened to permit the exhaust of the gases of combustion from the main combustion chamber 30 during an exhaust phase of the engine.

In embodiments, at least one of the cylinder block 22 and the cylinder head 24 defines one or more cooling medium cavities 33. Each cooling medium cavity 33 can be adapted to be placed in communication with a source of cooling medium 34 and configured to cool one or more components of the fuel combustion system 20. In embodiments, the cooling medium can be any suitable kind, such as, a coolant fluid, for example. In embodiments, any suitable technique can be used to circulate coolant fluid from the source of cooling medium 34 through the cooling medium cavities 33 in the cylinder block 22 and/or the cylinder head 24.

The prechamber assembly 25 is removably secured in the cylinder head 24 such that the prechamber assembly 25 is in communication with the main combustion chamber 30. The prechamber assembly 25 defines a precombustion chamber 37, which is in communication with the main combustion chamber 30. The prechamber assembly 25 includes a prechamber housing 42, an ignition device 44 adapted to selectively ignite fuel disposed in the precombustion chamber 37, a control valve 48, and the nozzle 50. The nozzle 50 and the prechamber housing 42 can be made from any suitable material, such as a suitable heat-resistant metal.

Suitable sealing devices 52, such as o-rings, for example, can be disposed between the prechamber assembly 25 and the cylinder head 24. In other embodiments, other sealing techniques, such as, press fit, metal seals, and the like, can be used to provide a seal between the prechamber assembly 25 and the cylinder block 22 and the cylinder head 24.

In embodiments, the nozzle 50 at least partially defines the precombustion chamber 37. In the illustrated embodiment, the nozzle 50 is adjacent the prechamber housing 42. The nozzle 50 and the prechamber housing 42 cooperate together to define the precombustion chamber 37 and to define a central longitudinal axis LA of the prechamber assembly 25. The nozzle 50 and the prechamber housing 42 include surfaces that are generally surfaces of revolution about the central longitudinal axis LA.

The precombustion chamber 37 has a predetermined geometric shape and volume. In embodiments, the volume of the precombustion chamber 37 is smaller than the volume of the main combustion chamber 30. In some embodiments, the volume of the precombustion chamber 37 is in a range between about one and about four percent of the total combustion chamber volume at top dead center.

The prechamber housing 42 is hollow and is adapted to receive the ignition device 44 therein. In the illustrated embodiment, the prechamber housing 42 includes an upper member 54 and a lower member 57 which are threadingly secured together. In other embodiments, other types of engagement between the upper member 54 and the lower member 57 can be used, such as, welding, press fitting, and the like.

The ignition device 44 is mounted to the prechamber housing 42. The illustrated lower member 57 of the prechamber housing 42 defines an ignition device bore 59 which has an internal threaded surface 62. The ignition device 44 has an external threaded surface 64 which is threadedly engaged with the internal threaded surface 62 of the ignition device bore 59. The ignition device bore 59 is in communication with the precombustion chamber 37.

In the illustrated embodiment, the ignition device 44 comprises a spark plug 67 with an electrode 69. The spark plug 67 is removably mounted to the prechamber housing 42 such that the electrode 69 is in communication with the precombustion chamber 37. The spark plug 67 is threadedly received in the ignition device bore 59 with the electrode 69 exposed to the precombustion chamber 37 by way of the ignition device bore 59. The spark plug 67 can be adapted to be electrically energized in a conventional manner.

In embodiments, at least one of the prechamber housing 42 and the nozzle 50 define a supplemental fuel passage 72. The supplemental fuel passage 72 is in communication with the precombustion chamber 37 and with the supplemental fuel source 27. In embodiments, the fuel of the supplemental fuel source 27 can have a richer fuel/air ratio than the fuel/air ratio of the fuel supplied directly to the main combustion chamber 30 with which the prechamber assembly 25 is associated.

In the illustrated embodiment of FIG. 1, the upper member 54 and the lower member 57 of the prechamber housing 42 both define the supplemental fuel passage 72. The illustrated upper member 54 defines a fuel passage entry segment 74. The illustrated lower member 57 of the prechamber housing 42 defines a plurality of precombustion chamber fuel passage segments 76 which are circumferentially arranged about the lower member 57 and in fluid communication with the fuel passage entry segment 74 via a control valve cavity 78 defined between the upper member 54 and the lower member 57.

The control valve 48 is disposed within the prechamber housing 42 and is adapted to selectively occlude the supplemental fuel passage 72 to prevent a flow of fuel from the supplemental fuel source 27 to the precombustion chamber 37. The illustrated control valve 48 is disposed within the control valve cavity 78 and is interposed between the fuel passage entry segment 74 and the precombustion chamber fuel passage segments 76. The control valve 48 can be adapted to selectively permit the flow of fuel from the supplemental fuel source 27 into the precombustion chamber 37 of the prechamber assembly 25 to further promote ignition within the precombustion chamber 37. The control valve 48 can be adapted to open and close with the engine's combustion cycle to prevent contamination of the fuel with exhaust and/or prevent leakage of fuel into the exhaust gases. The control valve 48 can be adapted to prevent the gas product of combustion to flow from the precombustion chamber 37 to the fuel passage entry segment 74 of the supplemental fuel passage 72 during the compression, combustion, and exhaust phases of the engine.

In embodiments, the control valve 48 can be any suitable control valve, such as a check valve assembly including a free-floating ball check having an open mode position permitting the flow of the fuel from the supplemental fuel source 27 to the precombustion chamber 37—and a closed mode position—preventing gas flow from the supplemental fuel source 27 to the precombustion chamber 37. In other embodiments, the control valve 48 can be a shuttle type check valve. In the illustrated embodiment, the control valve 48 is similar in construction and function to the check valve shown and described in U.S. Pat. No. 6,575,192.

The nozzle 50 is in communication with the main combustion chamber 30. The nozzle 50 includes a nozzle body 82 having a mounting end 84 and a distal tip 85. The nozzle body 82 defines the central longitudinal axis LA which extends between the mounting end 84 and the distal tip 85. The nozzle body 82 is hollow and includes an outer surface 88 and an inner surface 89. The outer surface 88 and the inner surface 89 are both surfaces of revolution about the central longitudinal axis LA.

The mounting end 84 of the nozzle 50 is in abutting relationship with the lower member 57 of the prechamber housing 42. The mounting end 84 of the nozzle body 82 includes an annular flange 92 that defines an external circumferential groove 93 configured to receive a suitable sealing device 52 (e.g., an o-ring) therein for sealing. Any suitable technique can be used to provide a seal between the nozzle 50 and the lower member 57 of the prechamber housing 42, such as, o-rings, press fit, metal seals, gaskets, welding, and the like.

The nozzle body 82 is positioned adjacent one of the cooling medium cavities 33 such that coolant fluid circulating through the cooling medium cavity 33 is in heat-transferring relationship with the nozzle body 82. The nozzle body 82 projects from the cylinder head 24 such that the distal tip 85 of the nozzle body 82 is disposed in the main combustion chamber 30 so that the distal tip 85 is in communicating relationship with the main combustion chamber 30. Any suitable sealing technique can be used to seal an interface 94 between the nozzle 50 and the cylinder block 22 and/or the cylinder head 24, such as, a gasket, a taper fit, and/or a press fit to isolate fuel, combustion gases, and engine coolant therein.

The inner surface 89 of the nozzle body 82 defines an interior chamber 95 which is open to and in communication with a distal cavity 97 defined in the lower member 57 of the prechamber housing 42. The interior chamber 95 of the nozzle body 82 and the distal cavity 97 of the lower member 57 together define the precombustion chamber 37 of the prechamber assembly 25. The interior chamber 95 of the nozzle body 82 is open to the electrode 69 of the spark plug 67 and is in fluid communication with the supplemental fuel passage 72 via the precombustion chamber fuel passage segments 76 of the lower member 57.

The mounting end 84 of the nozzle body 82 is generally cylindrical. The nozzle body 82 includes a converging portion 98 disposed adjacent the mounting end 84 and a distal cylindrical portion 99 adjacent the distal tip 85. The distal cylindrical portion 99 has a smaller diameter than that of the mounting end 84.

Figure 2:
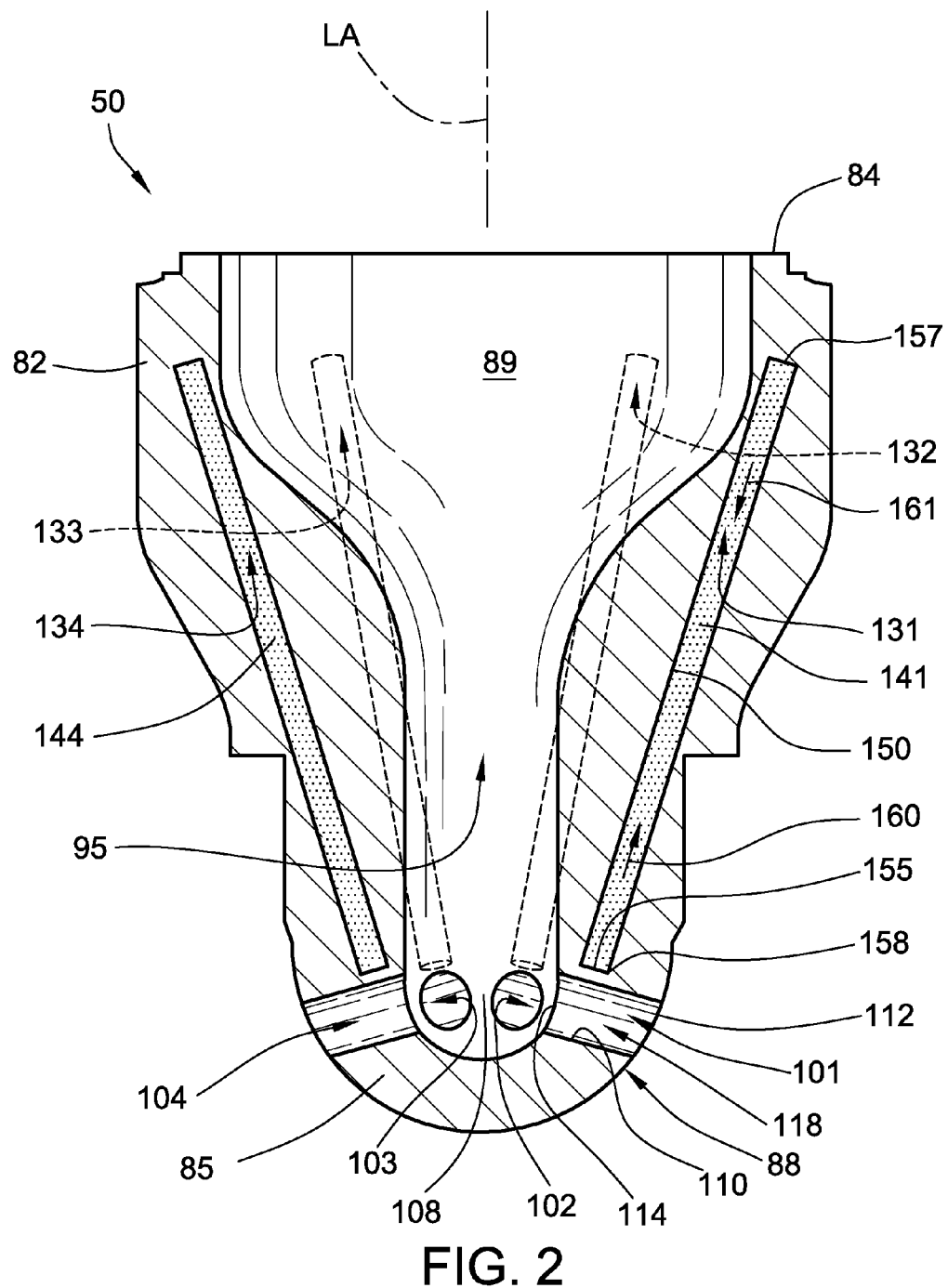
FIG. 2 is a diagrammatic, longitudinal cross-sectional view of an embodiment of a prechamber nozzle constructed in accordance with principles of the present disclosure, the prechamber nozzle being suitable for use in embodiments of a prechamber assembly following principles of the present disclosure.

Referring to FIGS. 1 and 2, the nozzle body 82 defines a plurality of orifices 101, 102, 103, 104 in the distal tip 85. The orifices 101, 102, 103, 104 are in communication with the interior chamber 95 of the nozzle body 82 and with the main combustion chamber 30 when the prechamber assembly 25 is installed in the cylinder housing 21. The nozzle body 82 includes an orifice bridge 108 defined circumferentially between the orifices 101, 102, 103, 104. The orifices 101, 102, 103, 104 can be configured such that flows of burning fuel respectively conveyed from the interior chamber 95 out through the orifices 101, 102, 103, 104 are controllably directed away from the nozzle body 82 in diverging relationship to each other, controllably expanding the burning gases away from the distal tip 85 of the nozzle 50 into the main combustion chamber 30 in order to facilitate the ignition and burning of the combustible mixture in the main combustion chamber 30 over a larger volume at the same time.

In embodiments, the nozzle body 82 can define any suitable number of orifices to achieve the desired flow characteristics within the interior chamber 95 of the nozzle body 82 and the desired flame discharge pattern in the main combustion chamber 30 resulting from the combustion phase in the nozzle 50. For example, in the illustrated embodiment, the nozzle body 82 includes six orifices (four of which are shown in FIG. 1 with the other two being mirror images of the second and third orifices 102, 103, respectively). The orifices 101, 102, 103, 104 are circumferentially arranged about the central longitudinal axis LA at substantially evenly-spaced angular positions (about sixty degrees apart from each other). The orifices 101, 102, 103, 104 are axially aligned along the central longitudinal axis LA.

Referring to FIGS. 1 and 2, the illustrated orifices 101, 102, 103, 104 are substantially identical to each other. Accordingly, it will be understood that the description of one orifice is applicable to the other orifices, as well.

The first orifice 101 includes an orifice surface 110 that defines the orifice 101. The outer surface 88 defines an outer orifice opening 112, and the inner surface 89 defines an inner orifice opening 114. The orifice surface 110 defines an orifice passage 118 extending between, and in communication with, the outer orifice opening 112 and the inner orifice opening 114. The orifice passage 118 is in communication with the interior chamber 95 via the inner orifice opening 114 and, when installed in the fuel combustion system 20, with the main combustion chamber 30 via the outer orifice opening 112. The orifice surface 110 is disposed in the distal tip 85. The other orifices 102, 103, 104 of the nozzle body 82 are similarly configured.

In other embodiments, the nozzle body 82 can define a different number of orifices, such as eight or twelve orifices circumferentially arranged about the central longitudinal axis LA at substantially evenly-spaced angular positions (about forty-five degrees and about thirty degrees apart from each other, respectively). In still other embodiments, the nozzle body 82 can define yet a different number of orifices. In other embodiments, the nozzle body 82 can define orifices that have variable spacing between at least two pairs of adjacent orifices and/or be axially offset from at least one other orifice along the central longitudinal axis LA.

As shown in FIG. 2, the orifices 101, 102, 103, 104 are respectively circumferentially disposed about the central longitudinal axis LA such that the orifices 101, 102, 103, 104 have the same relative inclined position with respect to the central longitudinal axis LA. In embodiments, the orifices 101, 102, 103, 104 can extend along a different angle of inclination relative to the central longitudinal axis LA. In still other embodiments, at least one of the orifices 101, 102, 103, 104 can extend along an angle of inclination relative to the central longitudinal axis LA that is different from at least one other of the orifices 101, 102, 103, 104.

Referring to FIGS. 1 and 2, in embodiments, the nozzle body 82 includes at least one coolant passage 131 configured to help promote the heat transfer between the nozzle body 82 and a cooling medium 141 disposed within the coolant passage. In embodiments, the nozzle body 82 includes at least one coolant passage 131 configured to facilitate the heat transfer away from an orifice 101 defined within the nozzle body 82. In embodiments, the nozzle body 82 includes at least one coolant passage 131 configured to help draw heat away from the orifice bridge 108 to a cooler region of the nozzle body 82.

The illustrated nozzle body 82 defines a plurality of coolant passages 131, 132, 133, 134. In embodiments, the nozzle body 82 can define any suitable number of coolant passages to achieve the desired heat transfer characteristics within the nozzle body 82. For example, in the illustrated embodiment, the nozzle body 82 includes six coolant passages (four of which are shown in FIGS. 1 and 2 with the other two being mirror images of the second and third coolant passages 132, 133, respectively).

The six coolant passages 131, 132, 133, 134 are circumferentially arranged about the central longitudinal axis LA at substantially evenly-spaced angular positions (about sixty degrees apart from each other) and are respectively circumferentially aligned with the orifices 101, 102, 103, 104. In embodiments, the coolant passages 131, 132, 133, 134 can be circumferentially arranged about the central longitudinal axis LA such that they are circumferentially offset with respect to the orifices 101, 102, 103, 104 in interposing relationship between adjacent orifices 101, 102, 103, 104.

The coolant passages 131, 132, 133, 134 are axially aligned along the central longitudinal axis LA. In other embodiments, the nozzle body 82 can define a different number of coolant passages.

Referring to FIG. 2, the illustrated coolant passages 131, 132, 133, 134 are substantially identical to each other. Accordingly, it will be understood that the description of one coolant passage is applicable to the other coolant passages, as well.

The nozzle body 82 includes a coolant surface 150 that defines the first coolant passage 131 within the nozzle body 82. In embodiments, the coolant surface 150 includes an orifice interface portion 155 disposed adjacent the orifice surface 110 of the first orifice 101 such that the orifice surface 110 and the orifice interface portion 155 of the coolant surface 150 are in heat-transferring relationship with each other.

The illustrated coolant surface 150 of the first coolant passage 131 comprises a closed surface such that the first coolant passage 131 is a closed cavity disposed within the nozzle body 82 between the outer surface 88 and the inner surface 89. The coolant surface 150 of the first coolant passage 131 includes a proximal end 157 and a distal end 158. The proximal end 157 is closer to the mounting end 84 of the nozzle body 82 along the central longitudinal axis LA than the distal end 158 is. The illustrated distal end 158 comprises the orifice interface portion 155 of the coolant surface 150, which is disposed adjacent the orifice surface 110.

The illustrated coolant surface 150 is substantially cylindrical, extending axially from the distal end 158 disposed adjacent the orifice surface 110 of the first orifice 101 to the proximal end 157 disposed near the mounting end 84 of the nozzle body 82. In embodiments, the coolant surface 150 can have a different shape and/or size.

For example, in embodiments, the coolant surface 150 can include a curved portion. In embodiments, the coolant surface 150 can be configured to have a shape that is complementary to the shape of the outer surface 88 and/or the inner surface 89. In embodiments, the shape of the coolant surface 150 can be configured to be substantially aligned with a geometric midpoint between the outer surface 88 and the inner surface 89 as it extends along the central longitudinal axis LA. In other embodiments, the coolant surface 150 can have a different configuration that follows a thermal conduction path defined by the interior volume of the nozzle body 82 between the outer surface 88 and the inner surface 89.

The other coolant passages 132, 133, 134 of the nozzle body 82 are configured substantially the same as the first coolant passage 131. In embodiments, at least one coolant passage has a configuration that is different from at least one other coolant passage defined in the nozzle body 82.

In embodiments, the nozzle body 82 includes a cooling medium 141 disposed within at least one coolant passage 131 in the nozzle body 82. The cooling medium 141 is configured to be in heat-transferring relationship with the orifice interface portion 155 of the coolant surface 150 that defines the coolant passage 131.

In embodiments, each of the coolant passages 131, 132, 133, 134 can have a suitable cooling medium 141, 144 disposed therein. In the illustrated embodiment, each of the coolant passages 131, 132, 133, 134 is substantially filled with a respective cooling medium 141, 144. In embodiments, the cooling medium 141 occupies part or all of the volume defined within the coolant passage 131 according to the type of cooling medium selected for use with the associated coolant passage, as will be understood by one skilled in the art.

The cooling media 141, 144 respectively disposed in the coolant passages 132, 133, 134 of the nozzle body 82 are substantially the same. Accordingly, it will be understood that the description of the cooling media 141 in the first coolant passage 131 is applicable to the cooling media 144 in the other coolant passages 132, 133, 134, as well. In embodiments, the cooling medium disposed in at least one coolant passage is different from the cooling medium disposed in at least one other coolant passage defined in the nozzle body 82.

In embodiments, the cooling medium 141 can comprise any suitable material or construction configured to help transfer heat away from the orifice interface portion 155. For example, in some embodiments, the cooling medium 141 comprises a solid material having a thermal conductivity that is higher than the thermal conductivity of the nozzle body 82.

In embodiments, the nozzle body 82 is made from a first material having a first thermal conductivity value. The cooling medium 141 is disposed within the coolant passage 131 and substantially fills the closed cavity defined therein. The cooling medium is made from a second material having a second thermal conductivity value. The second material is different from the first material, and the second thermal conductivity value is greater than the first thermal conductivity value.

In embodiments, the nozzle body 82 is made from at least one of a nickel alloy and a steel. In embodiments, the cooling medium 141 comprises one or more of aluminum, copper, gold, silver, and an alloy thereof. In some embodiments, the cooling medium 141 comprises oxygen-free copper.

In embodiments, the cooling medium 141 comprises a liquid material, and the coolant surface 150 and the cooling medium 141 cooperate together to act as a thermosiphon to provide heat transfer based on natural convection, which circulates the cooling medium 141 without the necessity of a mechanical pump. Convective movement of the liquid cooling medium 141 can start when the liquid disposed by the orifice interface portion 155 at the distal end 158 of the coolant surface 150 is heated through heat transfer from the orifice surface 110 and the interposed portion of the orifice bridge 108. The liquid cooling medium 141 that is so heated expands and becomes less dense, and thus more buoyant, than the cooler portion of the cooling medium 141 above it. Convection moves the heated liquid upward in the coolant passage 131 in a rising direction 160 as it is simultaneously replaced by cooler cooling medium 141 from above moving in a falling direction 161 returning by the effect of gravity. The density differences between the hotter and cooler liquid cooling medium 141 causes the circulation of the cooling medium 141 in a rise-and-fall pattern as the liquid becomes relatively hotter when it is near the orifice interface portion 155 and then cools as it rises toward the proximal end 157 of the coolant surface 150.

In embodiments, the cooling medium 141 comprises a material that is liquid when at an operating temperature and is solid when at another temperature less than the operating temperature. In embodiments, any suitable material can be used as the working material for the cooling medium 141, such as, sodium, cesium, and potassium, for example.

In other embodiments, the coolant surface 150 and the cooling medium 141 disposed therein cooperate together to comprise a multi-phase heat transfer device. The multi-phase heat-transfer device combines the principles of both thermal conductivity and phase transition to manage the transfer of heat between the orifice interface portion 155 and the proximal end 157 of the coolant surface 150. In such embodiments, the coolant surface 150 can comprise a vacuum tight, sealed containment shell. In embodiments, the cooling medium 141 comprises a material that undergoes a phase change from a liquid to a vapor upon receiving a sufficient amount of thermal energy. In embodiments, another fluid, such as air, for example, can also be disposed in the coolant passage 131 along with the cooling medium 141.

In operation, the liquid cooling medium 141 in contact with the thermally-conductive solid distal end 158 of the coolant surface 150 at the orifice interface portion 155 turns into a vapor by absorbing heat from that portion of the coolant surface 150. Heat is absorbed by vaporizing the liquid cooling medium 141. Since the coolant surface 150 contains a vacuum, the cooling medium 141 can boil and take up latent heat at well below its boiling point at atmospheric pressure.

The vapor then travels along the coolant passage 131 in the rising direction 160 to the cooler interface at the proximal end 157 of the coolant surface 150 and condenses back into a liquid, thereby releasing the latent heat. The cooler portion of the coolant surface 150 can act to transfer heat from the coolant passage 131 into other portions of the nozzle body 82. The condensed cooling medium 141 can move in the falling direction 161 to be returned to the orifice interface portion 155 by gravity, or, in some embodiments, by a suitable capillary wick structure within the coolant passage 131, and the cycle repeats.

Figure 3:
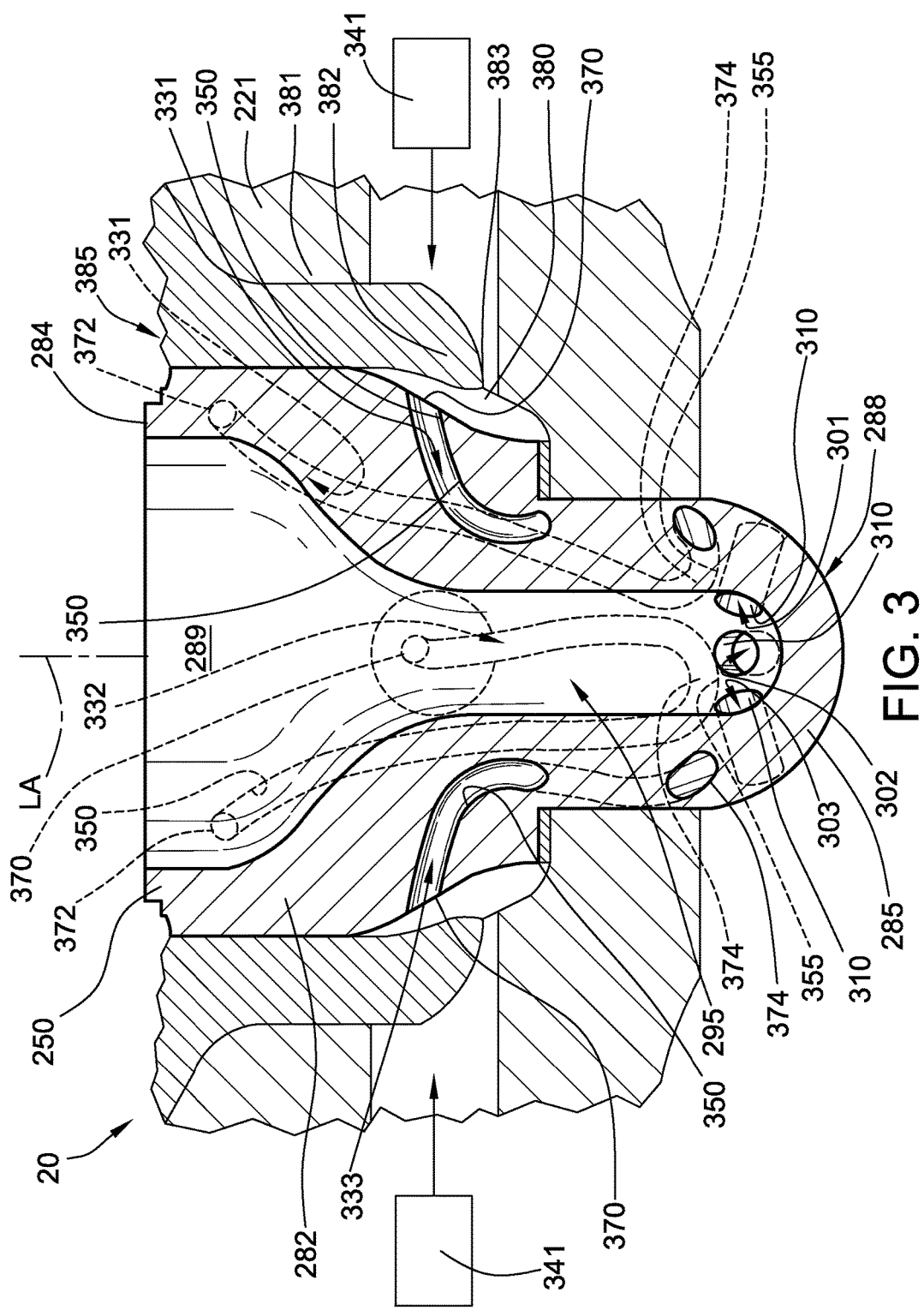
FIG. 3 is a diagrammatic, longitudinal cross-sectional view of another embodiment of a prechamber nozzle constructed in accordance with principles of the present disclosure, the prechamber nozzle being suitable for use in embodiments of a fuel combustion system having a prechamber assembly following principles of the present disclosure.
Figure 4:
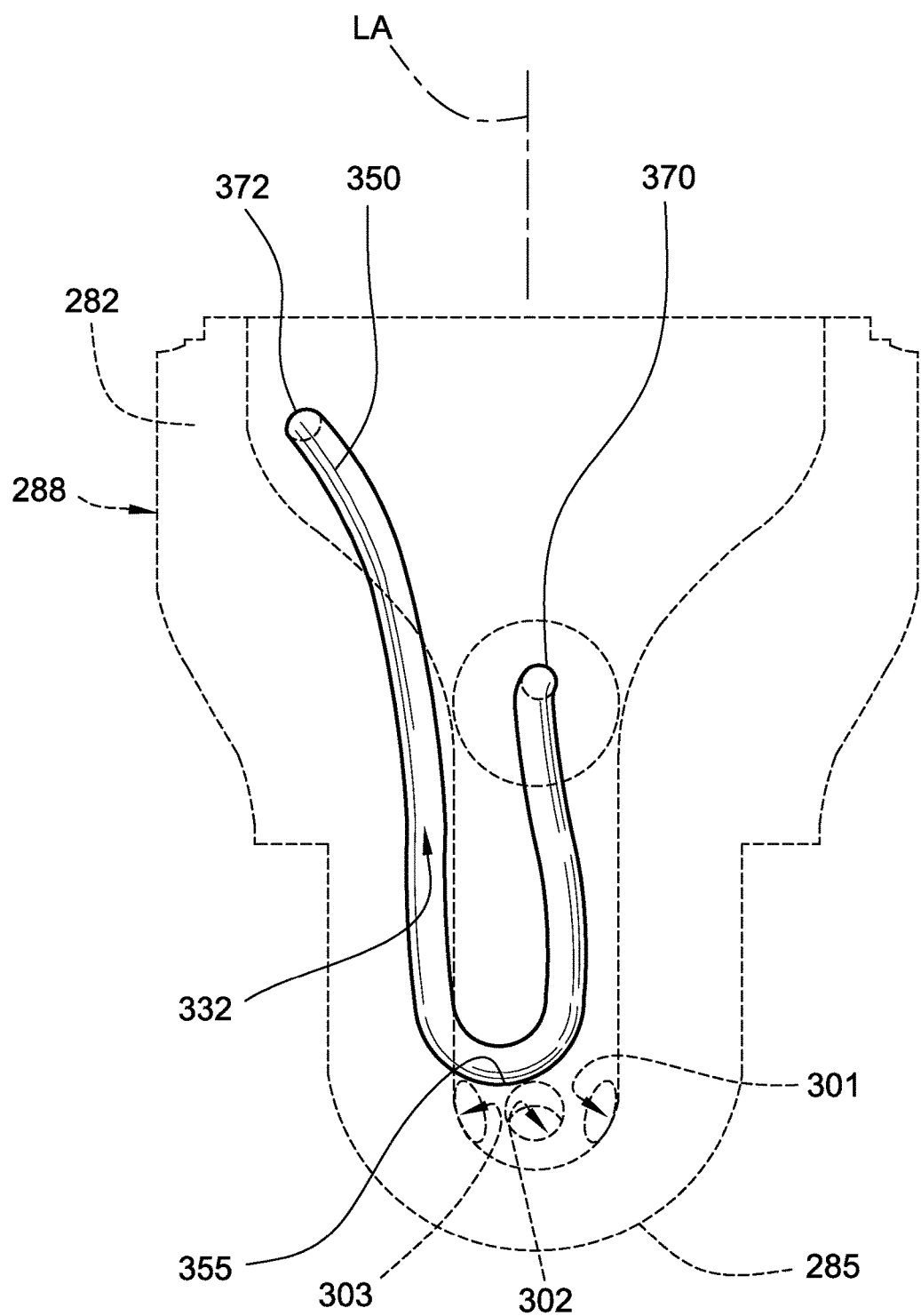
FIG. 4 is a view of the prechamber nozzle as in FIG. 3, but illustrating a coolant passage of the prechamber nozzle of FIG. 3.

Referring to FIGS. 3 and 4, another embodiment of a nozzle 250 constructed in accordance with principles of the present disclosure is shown. The nozzle 250 is suitable for use in a fuel combustion system constructed in accordance with principles of the present disclosure, such as, a nozzle for the prechamber assembly of a fuel combustion system, for example.

Referring to FIG. 3, the nozzle 250 includes a nozzle body 282 having a mounting end 284 and a distal tip 285. The nozzle body 282 defines the central longitudinal axis LA which extends between the mounting end 284 and the distal tip 285. The nozzle body 282 is hollow and includes an outer surface 288 and an inner surface 289. The outer surface 288 and the inner surface 289 are both surfaces of revolution about the central longitudinal axis LA. The inner surface 289 of the nozzle body 282 defines an interior chamber 295.

The nozzle body 282 defines a plurality of orifices 301, 302, 303 in the distal tip 285. The orifices 301, 302, 303 are in communication with the interior chamber 295 of the nozzle body 282 and with the main combustion chamber 30 when the nozzle 250 is installed in a suitable cylinder head. In the illustrated embodiment, the nozzle body 282 includes six orifices 301, 302, 303 (three of which are shown) which are circumferentially arranged about the central longitudinal axis LA at substantially evenly-spaced angular positions (about sixty degrees apart from each other). The illustrated orifices 301, 302, 303 are substantially identical to each other.

The illustrated nozzle body 282 defines a plurality of coolant passages 331, 332, 333. In embodiments, the nozzle body 282 can define any suitable number of coolant passages to achieve the desired heat transfer characteristics within the nozzle body 282. For example, in the illustrated embodiment, the nozzle body 282 includes four coolant passages (three of which are shown in FIG. 3 with the other coolant passage being in opposing relationship to the second coolant passage 332).

The four coolant passages 331, 332, 333 are circumferentially arranged about the central longitudinal axis LA at substantially evenly-spaced angular positions (about ninety degrees apart from each other) and are respectively circumferentially arranged with respect to the orifices 301, 302, 303 such that each coolant passage 331, 332, 333 is in heat-transferring relationship with a pair of adjacent orifices 301, 302, 303. In embodiments, the coolant passages 331, 332, 333 can be circumferentially arranged about the central longitudinal axis LA such that they are have a different relationship with the orifices 301, 302, 303.

Referring to FIG. 3, the illustrated coolant passages 331, 332, 333 are substantially similar. Accordingly, it will be understood that the description of one coolant passage is applicable to the other coolant passages, as well.

Referring to FIG. 4, it should be understood that each of the four coolant passages are disposed within the nozzle body 282, but that only the second coolant passage 332 is shown in FIG. 4 for illustrative purposes. The nozzle body 282 is shown in broken lines to illustrate the environment of the second coolant passage 332.

Referring to FIGS. 3 and 4, the nozzle body 282 includes a coolant surface 350 that defines the second coolant passage 332 within the nozzle body 282. The outer surface 288 defines a first coolant passage opening 370 and a second coolant passage opening 372. The coolant passage 332 extends between, and is in communication with, the first coolant passage opening 370 and the second coolant passage opening 372. In the illustrated embodiment, the first coolant passage opening 370 is closer to the distal tip 285 along the central longitudinal axis LA than the second coolant passage opening 372 is. The other coolant passages 331, 333 have a similar arrangement and include first and second coolant passage openings 370, 372 having a similar relationship.

In embodiments, each coolant surface 350 that defines the coolant passages 331, 332, 333 includes an orifice interface portion 355 disposed adjacent the orifice surface 310 of each orifice with which it is associated such that each such orifice surface 310 and the orifice interface portion 355 of the coolant surface 350 are in heat-transferring relationship with each other. In the illustrated embodiment, the coolant surface 350 defining the second coolant passage 332 has a bend portion 374 that includes the orifice interface portion 335 of the coolant surface 350. In the illustrated embodiment, the bend portion 374 is disposed adjacent the orifice surfaces 310 of both the second orifice 302 and the third orifice 303 such that the coolant surface 350 that defines the second coolant passage 332 is in heat-transferring relationship with the orifice surfaces 310 of both the second orifice 302 and the third orifice 303. The other coolant passages 331, 333 have a similar arrangement.

Referring to FIG. 3, each of the coolant passages 331, 332, 333 can have a suitable cooling medium 341 disposed therein. The cooling medium 341 is configured to be in heat-transferring relationship with the orifice interface portion 355 of the coolant surface 350 that defines the respective coolant passage 331, 332, 333. In the illustrated embodiment, the cooling medium 341 is a coolant fluid. In embodiments, the cooling medium 341 can comprise any suitable coolant fluid, as will be understood by one skilled in the art.

In embodiments, the cooling medium 341 is in fluid communication with each coolant passage 331, 332, 333 via at least one of the first coolant passage opening 370 and the second coolant passage opening 372 of each respective coolant passage 331, 332, 333. In embodiments, the fuel combustion system 20 is configured to circulate the cooling medium 341 through each coolant passage 331, 332, 333 such that the cooling medium 341 enters through one of the first coolant passage opening 370 and the second coolant passage opening 372 into the respective coolant passage 331, 332, 333, and exits out the other of the first coolant passage opening 370 and the second coolant passage opening 372 in a re-circulating manner. Once the cooling medium 341 exits from the nozzle 250, it can return to a place in which it can be re-circulated into one of the coolant passages 331, 332, 333 of the nozzle 250. In operation, each of the coolant passages 331, 332, 333 can be substantially filled with the cooling medium 341 which is substantially continuously flowing into and out of the respective coolant passage 331, 332, 333 via the first and second coolant passage openings 370, 372.

In the illustrated embodiment and with respect to the first coolant passage 331, the cylinder housing 221 defines a cooling medium cavity 380. The cooling medium 341 is disposed within the cooling medium cavity 380. The cooling medium cavity 380 is configured to establish a pressure gradient within the cooling medium 341 disposed therein. The pressure gradient drives the cooling medium 341 such that the cooling medium 341 enters through the first coolant passage opening 370 into the first coolant passage 331, and exits out the second coolant passage opening 372 thereof. Once the cooling medium 341 exits from the second coolant passage opening 372, it can return to the cooling medium cavity 380 to be re-circulated into the first coolant passage opening 370.

In embodiments, the head casting 381 of the cylinder housing 221 includes a separation ridge 382 in close proximity to the nozzle 250 that is configured to create the pressure gradient in the cooling medium 341 in the cooling medium cavity 380. Flow from the lower side 383 of the head casting 381 to the upper side 385 of the head casting 381 above the separation ridge, which is in fluid communication therewith, creates the water pressure gradient. The cooling medium 341 flows into the first coolant passage opening 370 into the first coolant passage 331, and exits out through the second coolant passage opening 372 above the separation ridge 382 in the head casting 381 to help cool the distal tip 285 in a passive manner, driven only by the pressure drop of the cooling medium 341. Each of the other coolant passages 332, 333 can have a similar arrangement with respect to an associated cooling medium cavity 380 and the head casting 381.

In embodiments, heat transfer between the nozzle body 282 and the cooling medium 341 can be varied by adjusting the flow rate of the cooling medium 341 through the coolant passages 331, 332, 333 and/or changing the size, configuration, and/or location of one or more of the coolant passages 331, 332, 333. The nozzle 250 of FIGS. 3 and 4 can be similar in other respects to the nozzle 50 of FIGS. 1 and 2.

Figure 5:
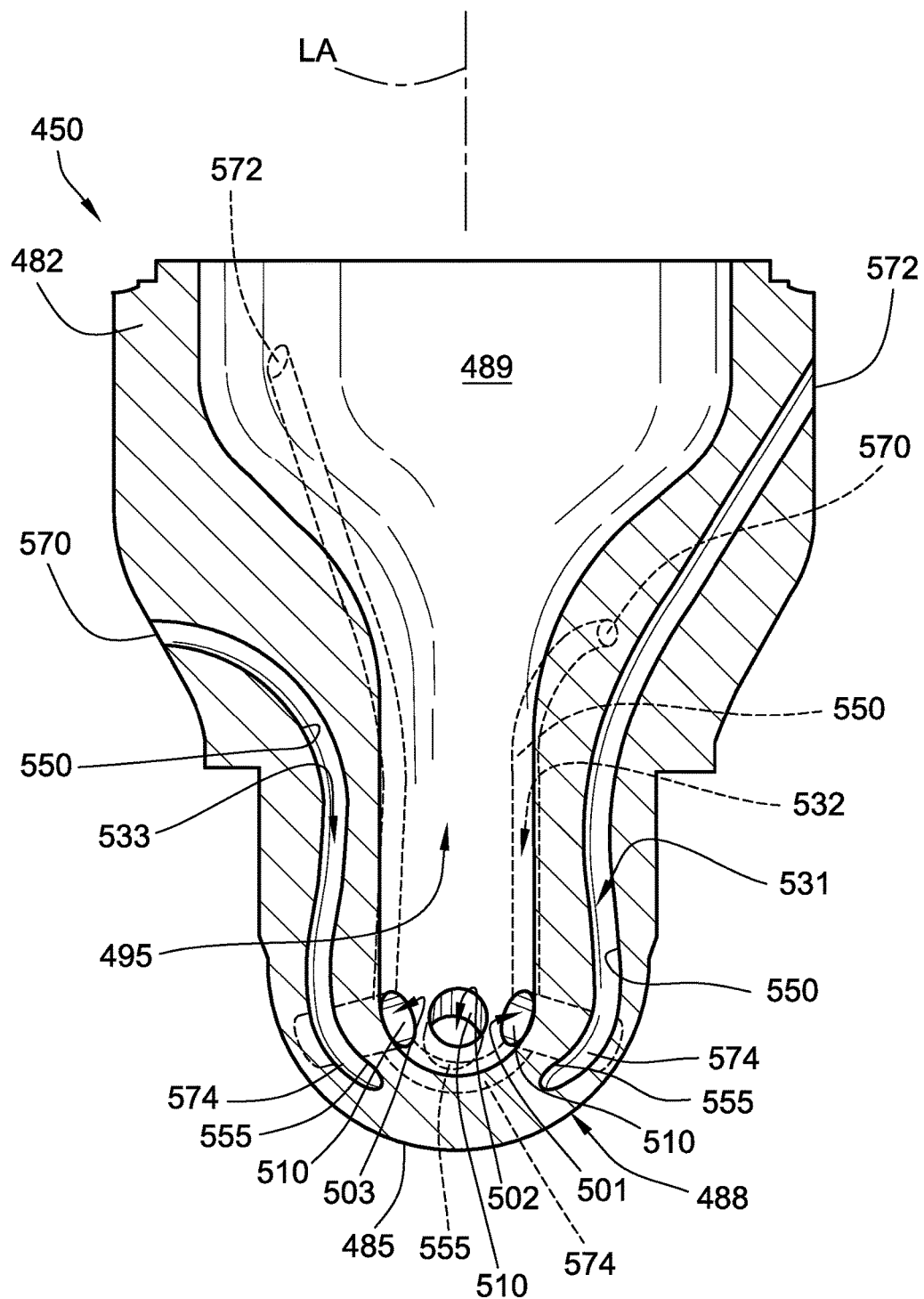
FIG. 5 is a diagrammatic, longitudinal cross-sectional view of yet another embodiment of a prechamber nozzle constructed in accordance with principles of the present disclosure, the prechamber nozzle being suitable for use in embodiments of a fuel combustion system having a prechamber assembly following principles of the present disclosure.

Referring to FIG. 5, another embodiment of a nozzle 450 constructed in accordance with principles of the present disclosure is shown. The nozzle 450 is suitable for use in a fuel combustion system constructed in accordance with principles of the present disclosure, such as, a nozzle for a prechamber assembly of a fuel combustion system, for example.

The nozzle 450 includes a nozzle body 482 that is hollow and includes an outer surface 488 and an inner surface 489. The outer surface 488 and the inner surface 489 are both surfaces of revolution about the central longitudinal axis LA. The inner surface 489 of the nozzle body 482 defines an interior chamber 495.

The nozzle body 282 defines a plurality of orifices 501, 502, 503 in the distal tip 485. The illustrated nozzle body 482 defines a plurality of coolant passages 531, 532, 533 corresponding to the plurality of orifices 501, 502, 503 in the nozzle body 482. The outer surface 488 defines a first coolant passage opening 570 and a second coolant passage opening 572 associated with each coolant passage 531, 532, 533. The respective coolant passage 531, 532, 533 extends between, and is in communication with, the first coolant passage opening 570 and the second coolant passage opening 572.

In embodiments, each coolant surface 550 that defines the coolant passages 531, 532, 533 includes an orifice interface portion 555 disposed adjacent the orifice surface 510 of the orifice 501, 502, 503 with which it is associated such that such orifice surface 510 and the orifice interface portion 555 of the coolant surface 550 are in heat-transferring relationship with each other. In the illustrated embodiment, the coolant surface 550 defining each coolant passage 531, 532, 533 has a bend portion 574 that includes the orifice interface portion 535 of the coolant surface 550. The bend portion 574 of each coolant surface 550 is disposed relative to the orifice surface 510 with which it is associated such that the bend portion 574 extends around the orifice surface 510. The nozzle 450 of FIG. 5 can be similar in other respects to the nozzle 250 of FIGS. 3 and 4.

It will be apparent to one skilled in the art that various aspects of the disclosed principles relating to fuel combustion systems and fuel combustion components can be used with a variety of engines. Accordingly, one skilled in the art will understand that, in other embodiments, an engine following principles of the present disclosure can include different fuel combustion components constructed according to principles of the present disclosure and can take on different forms.

Figure 6:
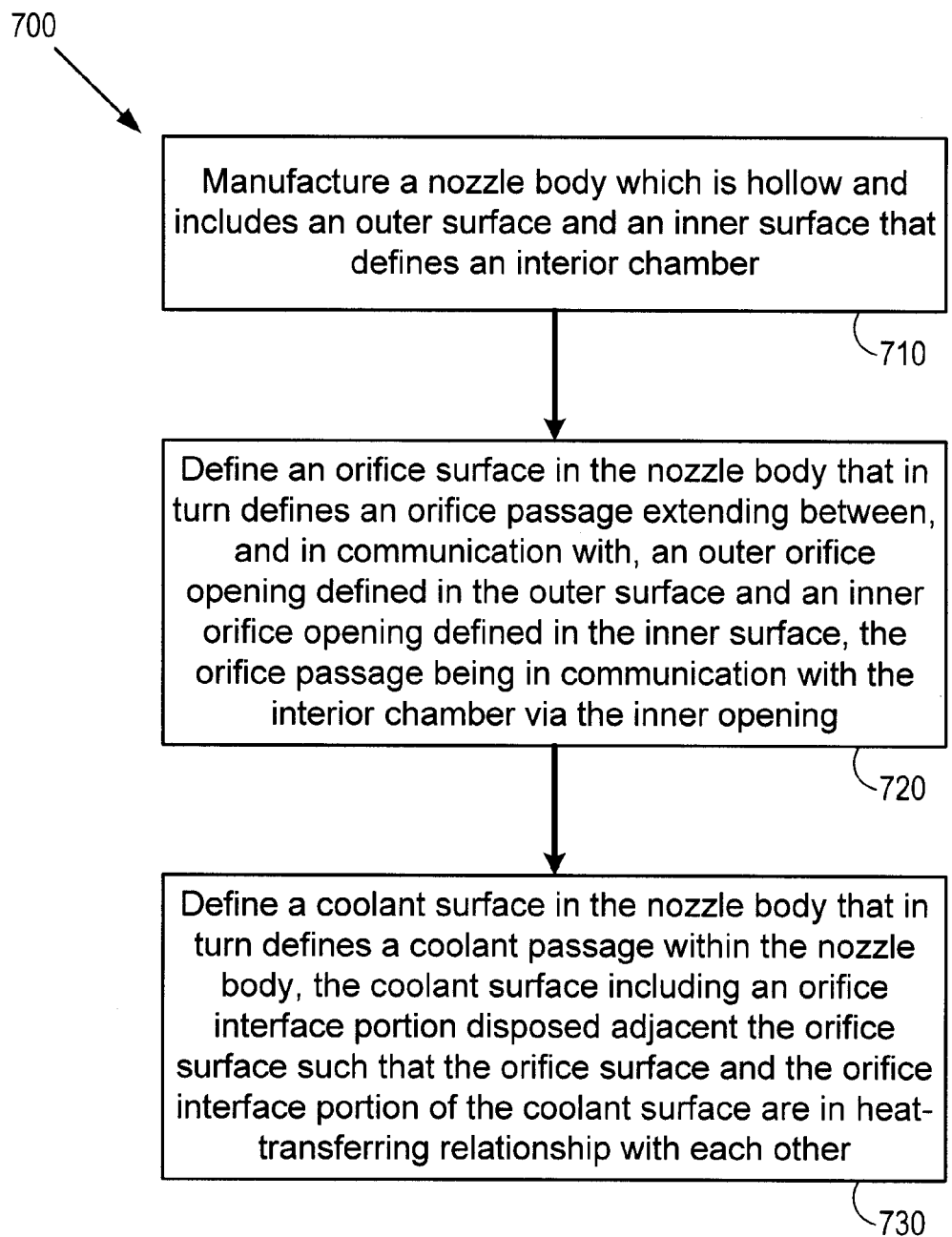
FIG. 6 is a flowchart illustrating steps of an embodiment of a method of making a nozzle for a prechamber assembly of an engine following principles of the present disclosure.

Referring to FIG. 6, steps of an embodiment of a method 700 of making a nozzle for a prechamber assembly of an engine following principles of the present disclosure are shown. In embodiments, a method of making a nozzle for a prechamber assembly of an engine following principles of the present disclosure can be used to make any embodiment of a nozzle for a prechamber assembly according to principles of the present disclosure. In other embodiments, the nozzle body can be any suitable nozzle body for use in a fuel combustion system.

The illustrated method 700 of making a nozzle for a prechamber assembly includes manufacturing a nozzle body (step 710). The nozzle body is hollow and includes an outer surface and an inner surface. The inner surface defines an interior chamber. In embodiments, the body is manufactured from a suitable material, such as a metal alloy. In embodiments, the body is made from at least one of a nickel alloy and a steel.

An orifice surface is defined in the nozzle body (step 720). The orifice surface defines an orifice passage extending between, and in communication with, an outer orifice opening defined in the outer surface and an inner orifice opening defined in the inner surface. The orifice passage is in communication with the interior chamber via the inner orifice opening.

A coolant surface is defined in the nozzle body (step 730). The coolant surface defines a coolant passage within the nozzle body. The coolant surface includes an orifice interface portion disposed adjacent the orifice surface such that the orifice surface and the orifice interface portion of the coolant surface are in heat-transferring relationship with each other.

In embodiments of a method of making a nozzle for a prechamber assembly following principles of the present disclosure, the nozzle body is manufactured and the coolant surface is defined via additive manufacturing (also sometimes referred to as "additive layer manufacturing" or "3D printing"). In embodiments, any suitable additive manufacturing equipment can be used. For example, in embodiments, a production 3D printer commercially available under the under the brand name ProX™ 200 from 3D Systems, Inc. of Rock Hill, S.C., can be used. In embodiments of a method of making a nozzle for a prechamber assembly following principles of the present disclosure, the nozzle body is manufactured and the orifice surface and the coolant surface are defined all via additive manufacturing. In still other embodiments, the nozzle body and each orifice surface and coolant surface are manufactured together via additive manufacturing, and each orifice passage and coolant passage is defined within the nozzle body substantially simultaneously with its manufacture.

In embodiments of a method of making a nozzle for a prechamber assembly following principles of the present disclosure, the coolant surface is defined in the nozzle body such that the coolant passage extends between, and is in communication with, a first coolant passage opening defined in the outer surface and a second coolant passage opening defined in the outer surface. In at least some of such embodiments, the coolant surface includes a bend portion. The bend portion of the coolant surface includes the orifice interface portion. In embodiments, the bend portion of the coolant surface is disposed relative to the orifice surface such that the bend portion extends around the orifice surface.

In embodiments, the nozzle body includes a mounting end and a distal tip. The nozzle body defines a central longitudinal axis extending between the mounting end and the distal tip. The orifice surface is disposed within the distal tip. The first coolant passage opening is closer to the distal tip along the central longitudinal axis than the second coolant passage opening is.

In other embodiments of a method of making a nozzle for a prechamber assembly following principles of the present disclosure, the coolant surface is defined in the nozzle body such that the coolant surface comprises a closed surface. The coolant passage is disposed within the nozzle body between the outer surface and the inner surface. The method of making can further include inserting a cooling medium within the coolant passage. The cooling medium can be configured to transfer heat from the coolant surface.

In at least some of such embodiments, the nozzle body is manufactured and the coolant surface is defined via additive manufacturing. The cooling medium is inserted within the coolant passage at a time when the coolant passage is at least partially defined and accessible. Additive manufacturing can continue to complete the nozzle body.

INDUSTRIAL APPLICABILITY

The industrial applicability of the embodiments of a fuel combustion system, a nozzle for a prechamber assembly, and a method of making the same as described herein will be readily appreciated from the foregoing discussion. At least one embodiment of a prechamber assembly constructed according to principles of the present disclosure can be used in an engine to help operate the engine with a lean fuel/air ratio. Embodiments of a nozzle and/or a prechamber assembly according to principles of the present disclosure may find potential application in any suitable engine. Exemplary engines include those used in electrical generators and pumps, for instance.

For example, in some internal combustion engines, the energy of an ignition spark may not be sufficient to ignite reliably the combustion gas/air mixture, which for emissions reasons is often very lean, in the main combustion chamber. To increase the ignition energy, a prechamber assembly constructed according to principles of the present disclosure can be connected to the cylinder head and placed in communication with the main combustion chamber via a plurality of orifices defined in the nozzle. A small part of the mixture is enriched with a small quantity of combustion gas or an additional fuel and ignited in the precombustion chamber.

Flame propagation, i.e. ignition kernel, is transferred to the main combustion chamber by way of the orifices in the nozzle and the flame propagation ignites the lean fuel mixture. The flame discharge pattern from the orifices can spread the flame pattern outwardly such that the flame area in the main combustion chamber is increased. The discharge flame pattern emitting from the nozzle is advantageous because it has a hot surface area that can ignite even extremely lean or diluted combustible mixtures in a repeatable manner.

Embodiments of a nozzle for a prechamber assembly constructed according to principles of the present disclosure can have a nozzle body that includes at least one coolant passage configured to help promote the heat transfer between the nozzle body and a cooling medium disposed within the coolant passage. In embodiments, the nozzle body includes at least one coolant passage configured to facilitate the heat transfer away from an orifice defined within the nozzle body. In operation, the flow of an air/fuel mixture into the prechamber nozzle and/or a flame front discharging from the prechamber nozzle respectively passing through the orifices of the nozzle during intended operation of the fuel combustion system cause elevated temperatures in the orifice bridge of the nozzle body. The nozzle can include at least one coolant passage configured to help draw heat away from the orifice bridge to a cooler region of the nozzle body.

The configuration of the coolant passage(s) in the nozzle body can increase the useful life of the fuel combustion component and help it withstand the ablative nature of the flows of fuel mixture/flame front with which its orifice(s) comes into heat-transferring relationship. The improved heat transfer characteristics can help reduce the amount of heat-induced damage suffered by the nozzle during operation. Embodiments of a prechamber nozzle constructed according to principles of the present disclosure can be made using additive manufacturing techniques.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A nozzle for a prechamber assembly of an engine, the nozzle comprising:
    a nozzle body, the nozzle body being hollow and including an outer surface, an inner surface, and an orifice surface, the outer surface defining an outer orifice opening, the inner surface defining an interior chamber and an inner orifice opening, and the orifice surface defining an orifice passage extending between, and in communication with, the outer orifice opening and the inner orifice opening, the orifice passage being in communication with the interior chamber via the inner orifice opening;
    wherein the nozzle body includes a coolant surface, the coolant surface defining a coolant passage within the nozzle body, the coolant surface including an orifice interface portion disposed adjacent the orifice surface such that the orifice surface and the orifice interface portion of the coolant surface are in heat-transferring relationship with each other.

2. The nozzle according to claim 1, wherein the coolant surface comprises a closed surface such that the coolant passage is a closed cavity disposed within the nozzle body between the outer surface and the inner surface, the nozzle further comprising:
    a cooling medium disposed within the coolant passage, the cooling medium configured to be in heat-transferring relationship with the orifice interface portion of the coolant surface.

3. The nozzle according to claim 2, wherein the nozzle body includes a mounting end and a distal tip, the nozzle body defining a central longitudinal axis extending between the mounting end and the distal tip, the orifice surface being disposed within the distal tip, and wherein the coolant surface includes a proximal end and a distal end, the proximal end being closer to the mounting end along the central longitudinal axis than the distal end is, the distal end comprising the orifice interface portion of the coolant surface disposed adjacent the orifice surface.

4. The nozzle according to claim 3, wherein the coolant surface and the cooling medium disposed therein cooperate together to comprise a multi-phase heat transfer device, the cooling medium comprising a material that undergoes a phase change from a liquid to a vapor upon receiving a sufficient amount of thermal energy.

5. The nozzle according to claim 1, wherein the outer surface defines a first coolant passage opening and a second coolant passage opening, and the coolant passage extends between, and is in communication with, the first coolant passage opening and the second coolant passage opening.

6. The nozzle according to claim 5, wherein the nozzle body includes a mounting end and a distal tip, the nozzle body defining a central longitudinal axis extending between the mounting end and the distal tip, the orifice surface being disposed within the distal tip, the first coolant passage opening is closer to the distal tip along the central longitudinal axis than the second coolant passage opening.

7. The nozzle according to claim 5, wherein the coolant surface includes a bend portion, the bend portion of the coolant surface comprising the orifice interface portion.

8. The nozzle according to claim 7, wherein the bend portion of the coolant surface is disposed relative to the orifice surface such that the bend portion extends around the orifice surface.

9. The nozzle according to claim 7, wherein the inner orifice opening, the outer orifice opening, the orifice surface, and the orifice passage respectively comprise a first inner orifice opening, a first outer orifice opening, a first orifice surface, and a first orifice passage, wherein the outer surface defines a second outer orifice opening, the inner surface defines a second inner orifice opening, and the nozzle body includes a second orifice surface, the second orifice surface defining a second orifice passage extending between, and in communication with, the second outer orifice opening and the second inner orifice opening, the second orifice passage being in communication with the interior chamber via the second inner orifice opening, and wherein the bend portion is disposed adjacent the first orifice surface and the second orifice surface such that the coolant surface is in heat-transferring relationship with both the first orifice surface and the second orifice surface.

10. A fuel combustion system comprising:
a cylinder housing, the cylinder housing defining a main combustion chamber;
a prechamber assembly, the prechamber assembly in communication with the main combustion chamber, the prechamber assembly defining a precombustion chamber, the precombustion chamber in communication with the main combustion chamber, the prechamber assembly including a prechamber housing, an ignition device adapted to selectively ignite a fuel supply disposed in the precombustion chamber, and a nozzle, the ignition device mounted to the prechamber housing, the nozzle adjacent the prechamber housing, the nozzle at least partially defining the precombustion chamber, the nozzle including:
a nozzle body, the nozzle body being hollow and including an outer surface, an inner surface, and an orifice surface, the outer surface defining an outer orifice opening, the inner surface defining an interior chamber and an inner orifice opening, and the orifice surface defining an orifice passage extending between, and in communication with, the outer orifice opening and the inner orifice opening, the orifice passage being in communication with the interior chamber via the inner orifice opening and with the main combustion chamber via the outer orifice opening, and
wherein the nozzle body includes a coolant surface, the coolant surface defining a coolant passage within the nozzle body, the coolant surface including an orifice interface portion disposed adjacent the orifice surface such that the orifice surface and the orifice interface portion of the coolant surface are in heat-transferring relationship with each other.

11. The fuel combustion system according to claim 10, wherein the nozzle body of the nozzle includes a mounting end and a distal tip, the nozzle body defining a central longitudinal axis extending between the mounting end and the distal tip, the orifice surface being disposed within the distal tip, wherein the coolant surface includes a proximal end and a distal end, the proximal end being closer to the mounting end along the central longitudinal axis than the distal end is, the distal end comprising the orifice interface portion of the orifice surface, and the distal end of the coolant passage being adjacent the orifice passage, and wherein the coolant surface of the nozzle comprises a closed surface such that the coolant passage is disposed within the nozzle body between the outer surface and the inner surface, the fuel combustion system further comprising:
a cooling medium disposed within the coolant passage, the cooling medium configured to be in heat-transferring relationship with the orifice interface portion of the coolant surface.

12. The fuel combustion system according to claim 11, wherein the coolant surface of the nozzle and the cooling medium disposed in the coolant passage cooperate together to comprise a heat pipe, the cooling medium comprising a material that undergoes a phase change from a liquid to a vapor upon receiving a sufficient amount of thermal energy.

13. The fuel combustion system according to claim 10, wherein the outer surface of the nozzle defines a first coolant passage opening and a second coolant passage opening, and the coolant passage extends between, and in communication with, the first coolant passage opening and the second coolant passage opening, the fuel combustion system further comprising:
a cooling medium, the cooling medium being a coolant fluid, the cooling medium in fluid communication with the coolant passage via at least one of the first coolant passage opening and the second coolant passage opening.

14. The fuel combustion system according to claim 13, wherein the fuel combustion system is configured to circulate the cooling medium through the coolant passage such that the cooling medium enters through one of the first coolant passage opening and the second coolant passage opening into the coolant passage, and exits out the other of the first coolant passage opening and the second coolant passage opening in a re-circulating manner.

15. The fuel combustion system according to claim 13, wherein the nozzle body includes a mounting end and a distal tip, the nozzle body defining a central longitudinal axis extending between the mounting end and the distal tip, the orifice surface being disposed within the distal tip, the first coolant passage opening being closer to the distal tip along the central longitudinal axis than the second coolant passage opening is, and wherein the cylinder housing defines a cooling medium cavity, the cooling medium disposed within the cooling medium cavity, the cooling medium cavity configured to establish a pressure gradient within the cooling medium disposed therein, the pressure gradient driving the cooling medium such that the cooling medium enters through the first coolant passage opening into the coolant passage, and exits out the second coolant passage opening.

16. A method of making a nozzle for a prechamber assembly of an engine, the method of making comprising:
   manufacturing a nozzle body, the nozzle body being hollow and including an outer surface and an inner surface, the inner surface defining an interior chamber;
   defining an orifice surface in the nozzle body, the orifice surface defining an orifice passage extending between, and in communication with, an outer orifice opening defined in the outer surface and an inner orifice opening defined in the inner surface, the orifice passage being in communication with the interior chamber via the inner orifice opening;
   defining a coolant surface in the nozzle body, the coolant surface defining a coolant passage within the nozzle body, the coolant surface including an orifice interface portion disposed adjacent the orifice surface such that the orifice surface and the orifice interface portion of the coolant surface are in heat-transferring relationship with each other.

17. The method of making according to claim 16, wherein the nozzle body is manufactured and the coolant surface is defined via additive manufacturing.

18. The method of making according to claim 16, wherein the coolant surface is defined in the nozzle body such that the coolant passage extends between, and is in communication with, a first coolant passage opening defined in the outer surface and a second coolant passage opening defined in the outer surface.

19. The method of making according to claim 16, wherein the coolant surface is defined in the nozzle body such that the coolant surface comprises a closed surface, the coolant passage being disposed within the nozzle body between the outer surface and the inner surface, the method of making further comprising:
   inserting a cooling medium within the coolant passage, the cooling medium configured to transfer heat from the coolant surface.

20. The method of making according to claim 19, wherein the nozzle body is manufactured and the coolant surface is defined via additive manufacturing, and wherein the cooling medium is inserted within the coolant passage at a time when the coolant passage is at least partially defined and accessible.

* * * * *